(12) United States Patent
Hirose et al.

(10) Patent No.: US 11,745,615 B2
(45) Date of Patent: Sep. 5, 2023

(54) POWER SYSTEM FOR VEHICLE

(71) Applicant: HONDA MOTOR CO., LTD., Tokyo (JP)

(72) Inventors: Motohisa Hirose, Saitama (JP);
Natsuki Ehara, Saitama (JP);
Nobuyuki Aruga, Saitama (JP);
Kazuaki Takizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/202,321

(22) Filed: Mar. 15, 2021

(65) Prior Publication Data
US 2021/0291688 A1    Sep. 23, 2021

(30) Foreign Application Priority Data

Mar. 18, 2020  (JP) .................................. 2020-047087

(51) Int. Cl.
| | |
|---|---|
| *B60L 53/62* | (2019.01) |
| *B60L 50/50* | (2019.01) |
| *B60L 1/00* | (2006.01) |
| *H02J 7/00* | (2006.01) |
| *B60L 53/30* | (2019.01) |

(Continued)

(52) U.S. Cl.
CPC ................. *B60L 53/62* (2019.02); *B60L 1/00* (2013.01); *B60L 50/50* (2019.02); *B60L 53/305* (2019.02); *B60L 53/53* (2019.02); *B60L 58/20* (2019.02); *H02J 7/0071* (2020.01)

(58) Field of Classification Search
CPC .......... B60L 53/62; B60L 50/50; B60L 53/53; B60L 53/305; B60L 58/20; B60L 1/00; H02J 7/0071

USPC ........................................................ 307/10.1
See application file for complete search history.

(56) References Cited

U.S. PATENT DOCUMENTS

| | | | |
|---|---|---|---|
| 2013/0127400 A1* | 5/2013 | Oh .......................... | B60L 58/20 320/104 |
| 2014/0145502 A1 | 5/2014 | Sugiyama et al. | |
| 2014/0214251 A1 | 7/2014 | Sugiyama et al. | |

(Continued)

FOREIGN PATENT DOCUMENTS

| | | |
|---|---|---|
| JP | 2000341801 A | 12/2000 |
| JP | 2014107968 A | 6/2014 |
| JP | 2014143868 A | 8/2014 |

*Primary Examiner* — Daniel Kessie
*Assistant Examiner* — Dru M Parries
(74) *Attorney, Agent, or Firm* — CKC & Partners Co., LLC

(57) ABSTRACT

A power system includes a charge circuit connecting a low voltage circuit to a high voltage circuit; a charge control unit configured to execute an auxiliary charge control to charge a low voltage battery; a BCM configured to accept an ON operation or an OFF operation; and an auxiliary charge timing setting unit configured to set an auxiliary charge timing at which the auxiliary charge control is to be executed during a standstill period, the standstill period starting from acceptance of the OFF operation and ending at acceptance of the ON operation. If a soak time is shorter than an auxiliary charge-allowing period, the charge control unit executes the auxiliary charge control at the auxiliary charge timing set by the auxiliary charge timing setting unit, whereas if the soak time is longer than the auxiliary charge-allowing period, the charge control unit does not execute the auxiliary charge control.

15 Claims, 12 Drawing Sheets

(51) Int. Cl.
*B60L 58/20* (2019.01)
*B60L 53/53* (2019.01)

(56) References Cited

U.S. PATENT DOCUMENTS

2016/0137092 A1* 5/2016 Thieme .................. B60R 16/03
307/10.6
2019/0080540 A1* 3/2019 Sim .......................... G07C 9/37

* cited by examiner

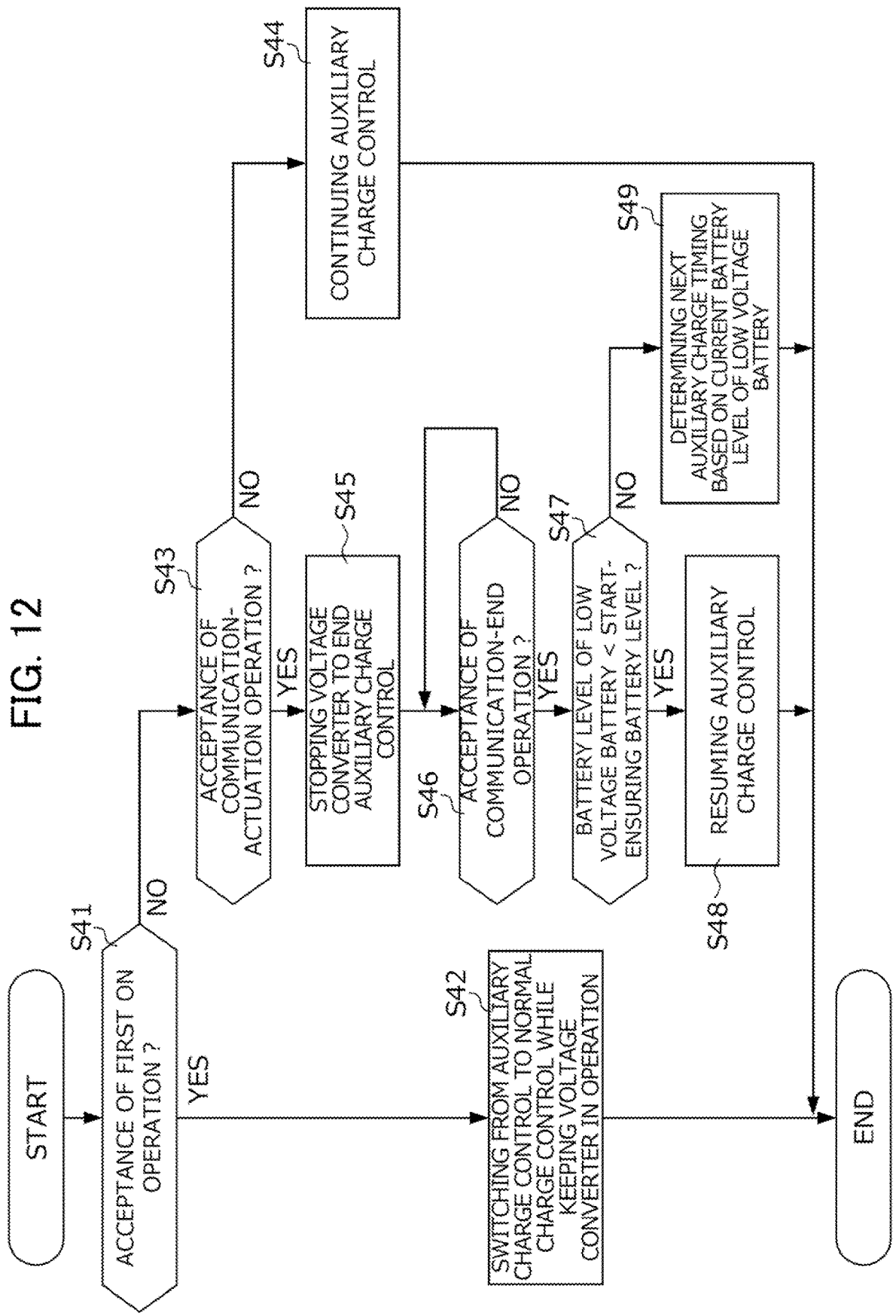

POWER SYSTEM FOR VEHICLE

This application is based on and claims the benefit of priority from Japanese Patent Application No. 2020-047067, filed on 18 Mar. 2020, the content of which is incorporated herein by reference.

BACKGROUND OF THE INVENTION

Field of the Invention

The present disclosure relates to a power system for a vehicle. More specifically, the present disclosure relates to a power system that charges a low voltage power storage device with electric power from a high voltage power storage device during a standstill of the vehicle.

Related Art

Power systems mounted on electric vehicles and hybrid vehicles include a high voltage battery that mainly stores electric power to be supplied to a traction motor and a low voltage battery that has a lower voltage than the high voltage battery and mainly stores electric power to be supplied to auxiliary equipment. For example, Patent Document 1 discloses a power system for an electric vehicle, the power system including a high voltage circuit provided with a high voltage battery, a low voltage circuit provided with a low voltage battery, the high voltage circuit being connected to the low voltage circuit via a voltage converter. When the low voltage battery becomes undercharged, the power system of Patent Document 1 reduces the voltage of the electric power from the high voltage battery to charge the low voltage battery. In the following description, charging a low voltage battery with electric power from a high voltage battery may be referred to as auxiliary charge.

Patent Document 1: Japanese Unexamined Patent Application, Publication No. 2000-341801

SUMMARY OF THE INVENTION

Meanwhile, during a standstill of a vehicle, an amount of power remaining in a low voltage battery gradually decreases due to a dark current. Therefore, if the vehicle is continuously at a standstill for a long period, the amount of power remaining in the low voltage battery may become less than a minimum amount required for actuating the vehicle, making it impossible to actuate the vehicle. To address this problem, it is conceivable to periodically perform the above-mentioned auxiliary charge during a standstill of the vehicle. However, in this case, due to the auxiliary charge being performed repeatedly, an amount of power remaining in the high voltage battery may decrease significantly without the user's knowledge.

The present disclosure is intended to provide a power system for a vehicle, the system being configured to perform auxiliary charging of a low voltage battery using electric power from a high voltage battery during a standstill of the vehicle, and being capable of preventing an amount of power remaining in the high voltage battery from decreasing significantly without the user's knowledge.

A first aspect of the present disclosure is directed to a power system (e.g., a power system 1 to be described later) for a vehicle (e.g., a vehicle V). The power system includes: a low voltage circuit (e.g., a low voltage circuit 3 to be described later) provided with a low voltage power storage device (e.g., a low voltage battery B2 to be described later); a high voltage circuit (e.g., a high voltage circuit 2 to be described later) provided with a high voltage power storage device (e.g., a high voltage battery B1 to be described later) having a higher voltage than the low voltage power storage device; a charge circuit (e.g., a voltage converter 4 to be described later) connecting the low voltage circuit to the high voltage circuit; a charge control unit (e.g., a charge control unit 701 to be described later) configured to execute an auxiliary charge control to charge the low voltage power storage device with electric power from the high voltage circuit by operating the charge circuit; an operation acceptance unit (e.g., a BCM 72, a power switch 83, and a brake pedal 84 to be described later) configured to accept an ON operation for actuating the vehicle or an OFF operation for bringing the vehicle to a standstill, the ON and OFF operations being performed by a user; and a timing setting unit (e.g., an auxiliary charge timing setting unit 702 to be described later) configured to set a charge timing at which the auxiliary charge control is to be executed during a standstill period of the vehicle, the standstill period starting from acceptance of the OFF operation and ending at acceptance of the ON operation. If a soak time as a time that has elapsed since the acceptance of the OFF operation is shorter than a predetermined first time period (e.g., an auxiliary charge-allowing period to be described later), the charge control unit executes the auxiliary charge control at the charge timing set by the timing setting unit. If the soak time is longer than the first time period, the charge control unit does not execute the auxiliary charge control.

A second aspect of the present disclosure is an embodiment of the first aspect. In the second aspect, the charge control unit preferably ends the auxiliary charge control when an amount of power remaining in the low voltage power storage device (e.g., a battery level to be described later) exceeds a first remaining amount of power (e.g., a target battery level to be described later) after start of the auxiliary charge control, or when a charge duration time as a time that has passed since the start of the auxiliary charge control exceeds a predetermined second time period (e.g., a maximum time limit).

A third aspect of the present disclosure is an embodiment of the second aspect. In the third aspect, it is preferable that the timing setting unit sets a next charge timing after end of the auxiliary charge control, and that if the auxiliary charge control has ended due to the charge duration time exceeding the second time period, the timing setting unit sets, as the charge timing, time calculated based on the amount of power remaining in the low voltage power storage device or predetermined time, whichever is later.

A fourth aspect of the present disclosure is an embodiment of the third aspect. In the fourth aspect, it is preferable that the operation acceptance unit is configured to accept a first ON operation performed by a user for actuating the vehicle in a traveling mode, the charge control unit is capable of selectively executing a normal charge control and the auxiliary charge control, the normal charge control being executed to charge the low voltage power storage device with the electric power from the high voltage circuit by operating the charge circuit when the vehicle is traveling, and the charge control unit switches from the auxiliary charge control to the normal charge control when the first ON operation is accepted during execution of the auxiliary charge control.

A fifth aspect of the present disclosure is an embodiment of the fourth aspect. In the fifth aspect, it is preferable that the operation acceptance unit is configured to accept a second ON operation performed by the user for actuating the vehicle in an accessory mode, and the charge control unit ends the auxiliary charge control when the second ON operation is accepted during execution of the auxiliary charge control.

A sixth aspect of the present disclosure is an embodiment of the fifth aspect. In the sixth aspect, it is preferable that the power system further includes a communication unit (e.g., a telematic ECU 73 and a communication module 74 to be described later) that is capable of communicating with a mobile terminal (e.g., a mobile terminal 85 to be described later) present outside the vehicle, and is configured to accept a communication-actuation operation performed by the user for actuating the vehicle in a communication mode. It is preferable that the charge control unit ends the auxiliary charge control when the communication-actuation operation is accepted during execution of the auxiliary charge control, and thereafter, resumes the auxiliary charge control when the amount of power remaining in the low voltage power storage device becomes less than a predetermined second amount of remining power (e.g., a start-ensuring battery level to be described later).

A seventh aspect of the present disclosure is directed to a power system (e.g., a power system 1 to be described later) for a vehicle (e.g., a vehicle V). The power system includes: a low voltage circuit (e.g., a low voltage circuit 3 to be described later) provided with a low voltage power storage device (e.g., a low voltage battery B2 to be described later); a high voltage circuit (e.g., a high voltage circuit 2 to be described later) provided with a high voltage power storage device (e.g., a high voltage battery B1 to be described later) having a higher voltage than the low voltage power storage device; a charge circuit (e.g., a voltage converter 4 to be described later) connecting the low voltage circuit to the high voltage circuit; a charge control unit (e.g., a charge control unit 701 to be described later) configured to execute an auxiliary charge control to charge the low voltage power storage device with electric power from the high voltage circuit by operating the charge circuit; an operation acceptance unit (e.g., a BCM 72, a power switch 83, and a brake pedal 84 to be described later) configured to accept an ON operation for actuating the vehicle or an OFF operation for bringing the vehicle to a standstill, the ON and OFF operations being performed by a user; a timing setting unit (e.g., an auxiliary charge timing setting unit 702 to be described later) configured to set a charge timing at which the auxiliary charge control is to be executed during a standstill period of the vehicle, the standstill period starting from acceptance of the OFF operation and ending at acceptance of the ON operation; and a remaining amount-acquisition unit (e.g., a management ECU 71 and a high voltage battery sensor 81 to be described later) configured to acquire an amount of power remining in the high voltage power storage device. If the amount of power remaining in the high voltage power storage device (e.g., a battery level to be described later) is greater than a predetermined third remaining amount of power (e.g., an auxiliary charge-disallowing battery level), the charge control unit executes the auxiliary charge control at the charge timing set by the charge timing setting unit If the amount of power remaining in the high voltage power storage device is less than the third remaining amount of power, the charge control unit does not execute the auxiliary charge control.

According to the first aspect of the present disclosure, the timing setting unit is configured to set the charge timing at which the auxiliary charge control is to be executed during a standstill period of the vehicle, the standstill period starting from acceptance of the OFF operation and ending at acceptance of the ON operation. If the soak time as a time that has elapsed since the acceptance of the OFF operation is shorter than the predetermined first time period, the charge control unit executes the auxiliary charge control at the charge timing set by the timing setting unit. This feature makes it possible to prevent the amount of power remaining in the low voltage power storage device from decreasing excessively. The charge control unit does not execute the auxiliary charge control if the soak time is longer than the first time period. With this feature, the auxiliary charge control is not allowed to be executed repeatedly in a case where the vehicle is continuously at a standstill for a long period exceeding the first time period, thereby preventing the amount of power remaining in the high voltage power storage device from decreasing significantly.

For example, charging of the low voltage power storage device proceeds with a lower charge efficiency in a low-temperature environment than in a normal-temperature environment. Therefore, continuing the auxiliary charge control in such a low-temperature environment until the amount of power remining in the low voltage power storage device reaches the first remaining amount may lead to a long charge time. In this case, the auxiliary charge control may consume an increased amount of electric power from the high voltage power storage device. To address this, according to the second aspect, the charge control unit ends the auxiliary charge control if the amount of power remaining in the low voltage power storage device exceeds the first remaining amount after start of the auxiliary charge control or if the charge duration time, which is a time that has elapsed since the start of the auxiliary charge control exceeds the second time period. This feature can prevent the amount of power remaining in the high voltage power storage device in a low-temperature environment from decreasing unintentionally and significantly due to the auxiliary charge control.

According to the third aspect of the present disclosure, the timing setting unit sets a next charge timing after end of the auxiliary charge control. If the auxiliary charge control has ended due to a charge duration time exceeding the second time period, the timing setting unit sets, as the charge timing, the time calculated based on the amount of power remaining in the low voltage power storage device or the predetermined time, whichever is later. With this feature, the auxiliary charge control is not allowed to be executed highly frequently in such a low-temperature environment that the charge duration time is prolonged to exceed the second time period, thereby preventing the amount of power remaining in the high voltage power storage device from decreasing significantly.

According to the fourth aspect of the present disclosure, when the first ON operation for actuating the vehicle in the traveling mode is accepted during execution of the auxiliary charge control, the charge control unit switches from the ongoing auxiliary charge control to the normal charge control. This feature makes it possible to continue charging the low voltage power storage device while allowing the user to perform the interrupt operation.

According to the fifth aspect of the present disclosure, when the second ON operation for actuating the vehicle in the accessory mode is accepted during execution of the auxiliary charge control, the charge control unit ends the auxiliary charge control. This feature makes it possible to avoid a situation in which the user is prevented from using vehicle auxiliary equipment because of excessively high priority assigned to the ongoing auxiliary charge control.

According to the sixth aspect of the present disclosure, when the communication-actuation operation performed via the mobile terminal by the user is accepted during execution of the auxiliary charge control, the charge control unit ends the auxiliary charge control. This feature makes it possible to avoid a situation in which the user's operation via the mobile terminal is hindered because of excessively high priority assigned to the ongoing auxiliary charge control.

According to the seventh aspect of the present disclosure, the timing setting unit sets the charge timing at which the charge control unit executes the auxiliary charge control during a standstill period of the vehicle from acceptance of the user's OFF operation to acceptance of the user's ON operation, while the remaining amount acquisition unit acquires the amount of power remaining in the high voltage power storage device. Further, if the amount of power remaining in the high voltage power storage device is greater than the third remaining amount, the charge control unit executes the auxiliary charge control at the charge timing set by the timing setting unit. This feature can prevent the amount of power remaining in the low voltage power storage device from decreasing excessively during the standstill of the vehicle. If the amount of power remaining in the high voltage power storage device is less than the third remaining amount, the charge control unit does not execute the auxiliary charge control. With this feature, the auxiliary charge control is not allowed to be executed repeatedly during a standstill of the vehicle, thereby making it possible to prevent the amount of power remaining in the high voltage power storage device from decreasing to become lower than the third remaining amount.

BRIEF DESCRIPTION OF THE DRAWINGS

FIG. 12 is a flowchart illustrating an interrupt process that is executed when the first ON operation or the communication-actuation operation is performed by the user during execution of the auxiliary charge.

DETAILED DESCRIPTION OF THE INVENTION

Figure 1:
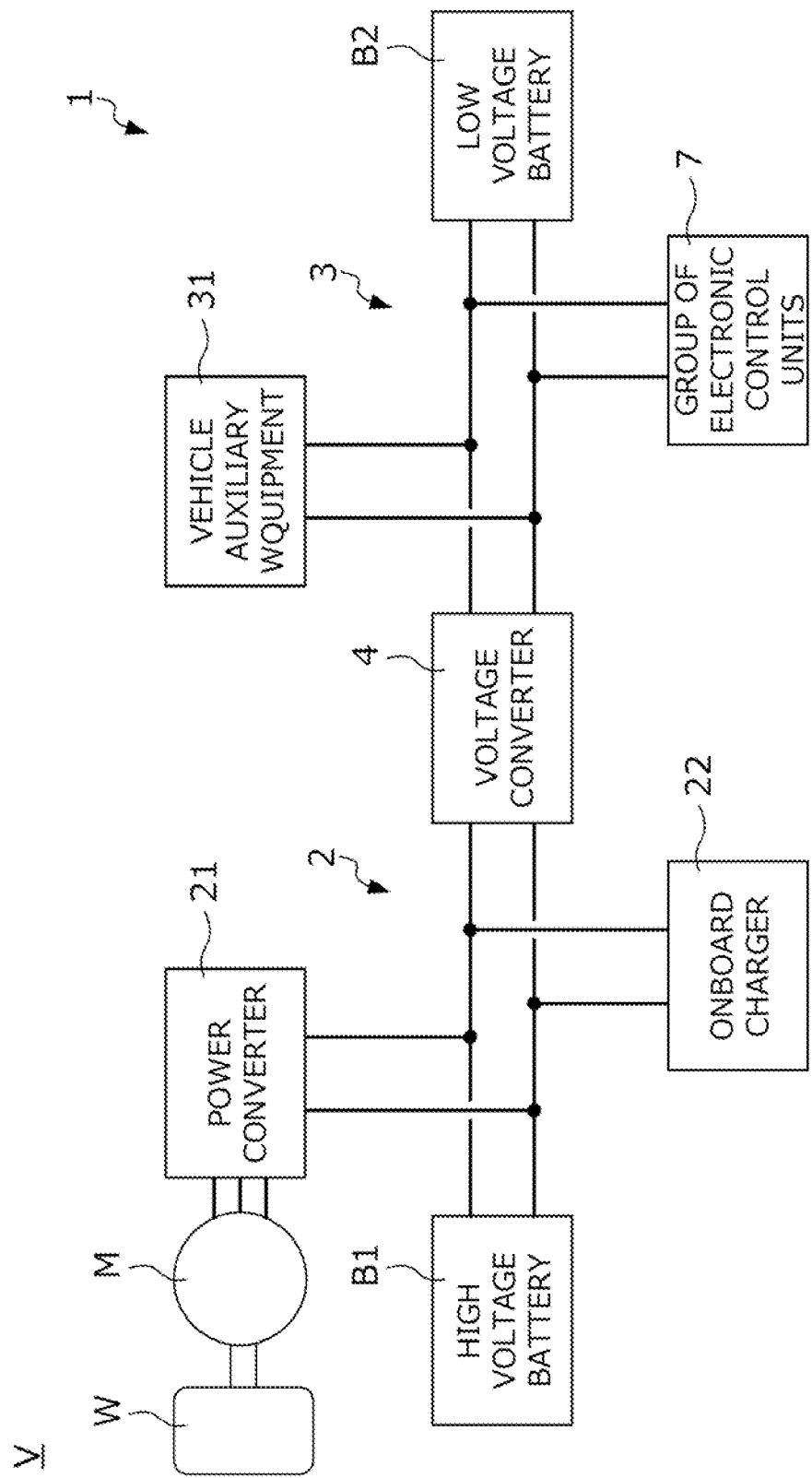
FIG. 1 is a diagram illustrating a configuration of a vehicle equipped with a power system according to an embodiment of the present disclosure.

An embodiment of the present disclosure will be described with reference to the drawings. FIG. 1 is a diagram illustrating a configuration of a vehicle V equipped with a power system 1 according to the present embodiment.

The vehicle V includes drive wheels W and the power system 1 that allows an exchange of electric power between a drive motor M coupled to the drive wheels W and a high voltage battery B1 to be described later. The present embodiment will be described on the assumption that the vehicle V is an electric vehicle that is accelerated and decelerated by drive power generated mainly by the drive motor M. However, this is a non-limiting example. The vehicle V may be a so-called hybrid vehicle equipped with a drive motor M and an engine as drive power sources.

The drive motor M is coupled to the drive wheels W via a power transmission mechanism (not illustrated). When the power system 1 supplies three-phase AC power to the drive motor M, the drive motor M generates a torque. The torque generated by the drive motor M is transmitted to the drive wheels W via the power transmission mechanism (not illustrated) and rotates the drive wheels W, thereby causing the vehicle 1 to travel. When the vehicle V is decelerated, the drive motor M functions as a generator. The drive motor M generates regenerative power and provides the drive wheels W with a regenerative braking torque according to the intensity of the regenerative power. The regenerative power generated by the drive motor M is charged to the high voltage battery B1 and a low voltage battery B2 of the power system 1, as appropriate.

The power system 1 includes a high voltage circuit 2 provided with the high voltage battery B1, and a low voltage circuit 3 provided with the low voltage battery B2, a voltage converter 4 connecting the high voltage circuit 2 to the low voltage circuit 3, and a group 7 of electronic control units that control the high voltage circuit 2, the low voltage circuit 3, and the voltage converter 4.

The high voltage battery B1 is a secondary battery capable of performing both discharge and charge. The discharge is performed in the form of conversion of chemical energy into electrical energy, whereas the charge is performed in the form of conversion of electrical energy into chemical energy. In the following, a case where a so-called lithium ion battery that performs charge and discharge by causing lithium ions to move between electrodes is used as the high voltage battery B1 will be described as a non-limiting example.

The low voltage battery B2 is a secondary battery capable of performing both discharge and charge. The charge is performed in the form of conversion of chemical energy into electrical energy, whereas the charge is performed in the form of conversion of electrical energy into chemical energy. In the following, a case where a so-called lead acid battery that includes a positive electrode of lead dioxide, a negative electrode of sponge lead, and an electrolyte of diluted sulfuric acid is used as the low voltage battery B2 will be described as a non-limiting example. The low voltage battery B2 has a lower voltage than the high voltage battery B1. Thus, the high voltage circuit 2 has a higher voltage than the low voltage circuit 3.

The voltage converter 4 connects the high voltage circuit 2 to the low voltage circuit 3. The voltage converter 4 is a DC-DC converter constituted by a combination of, for example, a switching element, a reactor, and a smoothing capacitor, and has a function of converting a voltage between the high voltage circuit 2 and the low voltage circuit 3. The voltage converter 4 turns on and off the switching element in response to a gate drive signal generated by a gate drive circuit (not illustrated) at a predetermined timing in accordance with a command from the group 7 of electronic control units. In this manner, the voltage converter 4 reduces the voltage of the power from the high voltage circuit 2 and supplies the power to the low voltage circuit 3.

The high voltage circuit 2 is connected to a power converter 21 and an onboard charger 22.

The power converter 21 converts power between the high voltage circuit 2 and the drive motor M. The power converter 21 is, for example, a PWM inverter performing pulse width modulation, and has a function of converting DC power into AC power and vice versa. The power converter 21 is connected to the high voltage circuit 2 at its DC input/output side, and is connected to a U-phase coil, a V-phase coil, and a W-phase coil of the drive motor M at its AC input/output side. The power converter 21 turns on and off switching elements of the respective phases in response to a gate drive signal generated by the gate drive circuit (not illustrated) at a predetermined timing in accordance with a command from the group 7 of electronic control units. In this manner, the power converter 21 coverts DC power of the high voltage circuit 2 into three-phase AC power and supplies the three-phase AC power to the drive motor M. The power converter 21 also coverts three-phase AC power supplied from the drive motor M into DC power and supplies the DC power to the high voltage circuit 2.

The onboard charger 22 is connectable to, for example, a household/commercial AC power source (not illustrated). When connected to the AC power source, the onboard charger 22 coverts AC power supplied from the AC power source into DC power, and supplies the DC power to the high voltage circuit 2, thereby charging the high voltage battery B1. At this time, the voltage converter 4 is driven so that power from the high voltage circuit 2 is reduced in voltage and supplied to the low voltage circuit 3, whereby the low voltage battery B2 can also be charged. In the following description, charging of the high voltage battery B1 via the onboard charger 22 is referred to as external charge.

The low voltage circuit 3 is connected to vehicle auxiliary equipment 31 and the group 7 of electronic control units. The vehicle auziliary equipment 31 and the group 7 of electronic control units operate by consuming power of the low voltage circuit 3. The vehicle auziliary equipment 31 includes a plurality of electrical components such as lamps, a car navigation system, audio equipment, and an air compressor.

Figure 2:
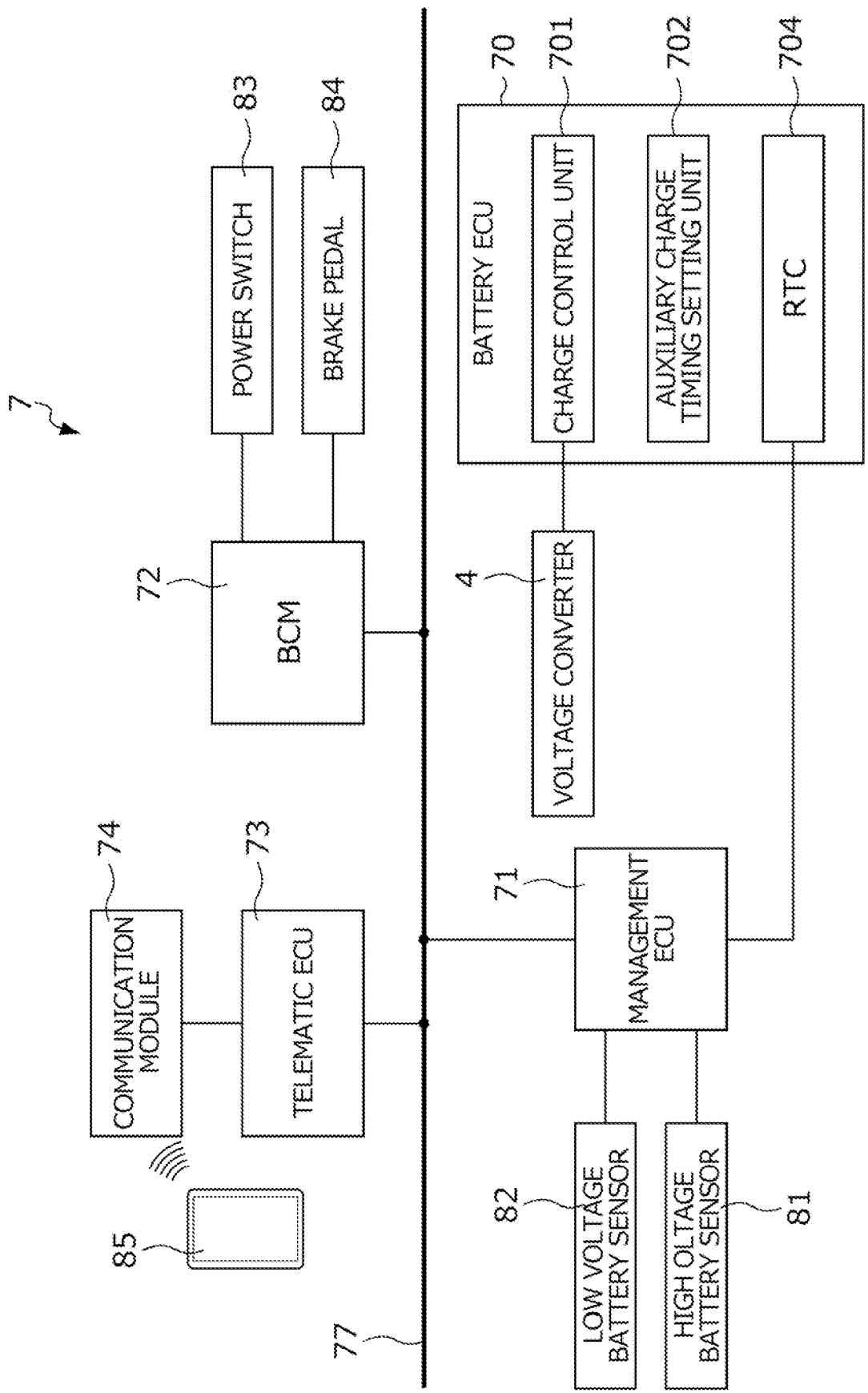
FIG. 2 is a diagram illustrating a configuration of a group of electronic control units.

FIG. 2 is a diagram illustrating a configuration of the group 7 of electronic control units. The group 7 of electronic control units includes a battery ECU 70, a management ECU 71, a body control module 72 (hereinafter referred to as the "BCM 72"), and a telematic ECU 73. The battery ECU 70, the management ECU 71, the BCM 72, and the telematic ECU 73 are connected to one another via a CAN bus 77 as a bus-type network that allows exchange of various items of control information, and are capable of transmitting and receiving necessary control information therebetween.

The management ECU 71 is a microcomputer that mainly performs control associated with monitoring of a state of the high voltage battery B1 and a state of the low voltage battery B2. The management ECU 71 is connected to a high voltage battery sensor 81 and a low voltage battery sensor 82.

The high voltage battery sensor 81 detects physical quantities that are necessary for the management ECU 71 to estimate a battery level (an amount of electric power stored in a battery, represented in percentage) of the high voltage battery B1, and transmits signals corresponding to the detected values to the management ECU 71. More specifically, the high voltage battery sensor 81 includes, for example, a voltage sensor for detecting a terminal voltage of the high voltage battery B1, a current sensor for detecting a current passing through the high voltage battery B1, and a temperature sensor for detecting a temperature of the high voltage battery B1. The management ECU 71 calculates the battery level of the high voltage battery B1, based on the signals transmitted from the high voltage battery sensor 81 and according to a known algorithm.

The low voltage battery sensor 82 detects physical quantities that are necessary for the management ECU 71 to estimate a battery level (an amount of electric power stored in a battery, represented in percentage) of the low voltage battery B2, and transmits signals corresponding to the detected values to the management ECU 71. More specifically, the low voltage battery sensor 82 includes, for example, a voltage sensor for detecting a terminal voltage of the low voltage battery B2, a current sensor for detecting a current passing through the low voltage battery B2, and a temperature sensor for detecting a temperature of the low voltage battery B2. The management ECU 71 calculates the battery level of the low voltage battery B2, based on the signals transmitted from the low voltage battery sensor 82 and according to a known algorithm.

The BCM 72 is a microcomputer that performs control associated with acceptance of, for example, an operation for actuating the vehicle, an operation for bringing the vehicle to a standstill, an operation for locking the vehicle's doors, and an entry operation of the vehicle. The BCM 72 is connected to, for example, a power switch 83 and a brake pedal 84 that are operable by a user.

Based on signals transmitted from the power switch 83 and the brake pedal 84, the BCM 72 accepts ON operations for actuating the vehicle or an OFF operation for bringing the vehicle to a standstill, the ON and OFF operations being performed by the user. The user can perform three types of operations, namely, a first ON operation, a second ON operation, and the OFF operation by operating the power switch 83 and the brake pedal 84 in combination.

The first ON operation refers to an operation for actuating the vehicle in a traveling mode. The user performs the first ON operation by pressing the power switch 83 while depressing the brake pedal 84 in parallel. Upon accepting the first ON operation performed by the user, the BCM 72 actuates the vehicle in the traveling mode to make the vehicle ready to travel. The second ON operation refers to an operation for actuating the vehicle in an accessory mode. The user performs the second ON operation by pressing the power switch 83 without depressing the brake pedal 84. Upon accepting the second ON operation performed by the user, the BCM 72 actuates the vehicle in the accessory mode to make the vehicle auxiliary equipment ready for use. The OFF operation refers to an operation for bringing the vehicle to a standstill. The user performs the OFF operation by pressing the power switch 83. Upon accepting the OFF operation performed by the user, the BCM 72 brings the vehicle to a standstill.

The telematic ECU 73 is a microcomputer that mainly performs control associated with communication with a mobile terminal 85 (e.g., a smartphone) belonging to the user. The telematic ECU 73 is capable of communicating with the mobile terminal 85 present outside the vehicle via a communication module 74.

The telematic ECU 73 accepts, based on a signal transmitted from the communication module 74, a communication-actuation operation for actuating the vehicle in a communication mode, the communication-actuation operation being performed via the mobile terminal 85 by the user. Upon accepting the communication-actuation operation performed by the user, the telematic ECU 73 actuates the vehicle in the communication mode. As a result, the user can, for example, acquire vehicle information (e.g., a battery level of the high voltage battery B1), set a charge schedule for the high voltage battery B1, and turn on an air conditioner.

The battery ECU 70 is a microcomputer that mainly performs a charge control of the low voltage battery B2. The battery ECU 70 includes a charge control unit 701, an auxiliary charge timing setting unit 702, and a real time clock 704 (hereinafter referred to as the "RTC 704".)

The charge control unit 701 performs the charge control for charging the low voltage battery B2 with electric power from the high voltage circuit 2 by operating the voltage converter 4. The charge control unit 701 is capable of selectively executing a normal charge control and an auxiliary charge control as the charge control for charging the low voltage battery B2. The normal charge control is executed when the vehicle is traveling, in such way that the charge control unit 701 operates the voltage converter 4 to reduce the voltage of the electric power from the high voltage circuit 2, and supplies the electric power to the low voltage circuit 3 so as to charge the low voltage battery B2. The auxiliary charge control is executed during a standstill of the vehicle, in such way that the charge control unit 701 operates the voltage converter 4 to reduce the voltage of the electric power from the high voltage circuit 2, and supplies the electric power to the low voltage circuit 3 so as to charge the low voltage battery B2.

When the vehicle is traveling, the high voltage circuit 2 is supplied with electric power outputted from the high voltage battery B1 and regenerative power outputted from the power converter 21. Therefore, under the normal charge control, the low voltage battery B2 can be charged with the electric power from the high voltage battery B1 and the regenerative power. During a period in which the vehicle is in operation in the travelling mode, the charge control unit 701 appropriately executes the normal charge control such that the battery level of the low voltage battery B2 is maintained at a predetermined target battery level.

In contrast, when the vehicle is at a standstill and the external charge via the onboard charger 22 is not performed, the high voltage circuit 2 is supplied with only the electric power outputted from the high voltage battery B1. Accordingly, under the auxiliary charge control, the low voltage battery B2 can be charged with the electric power from the high voltage battery B1.

Figure 3:
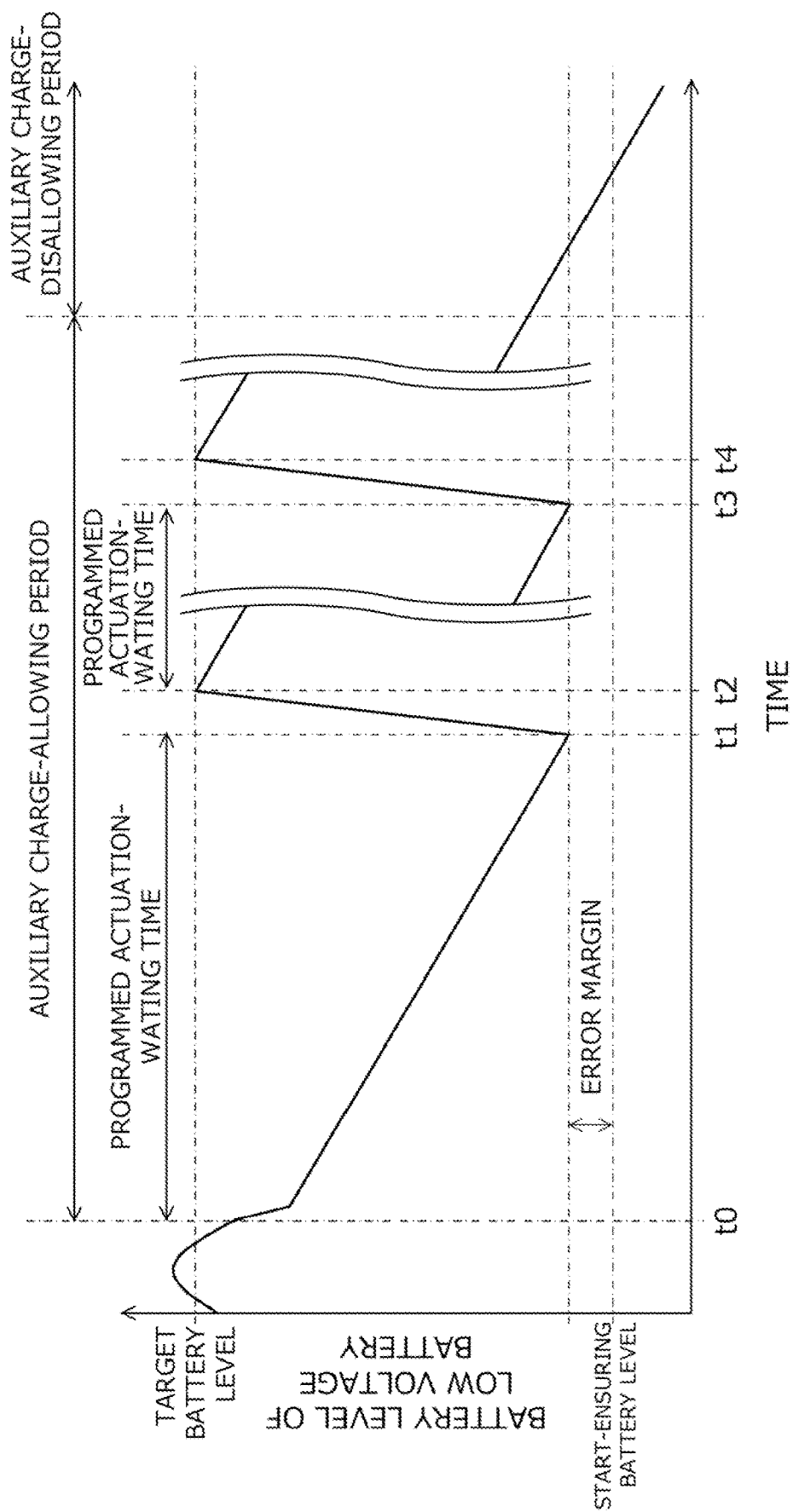
FIG. 3 illustrates changes in a battery level of a low voltage battery during a standstill of the vehicle.

FIG. 3 illustrates changes in the battery level of the low voltage battery B2 during a standstill of the vehicle. FIG. 3 illustrates a case where the user performs the OFF operation at time t0. As illustrated in FIG. 3, during the standstill of the vehicle, the battery level of the low voltage battery B2 gradually decreases due to a dark current constantly passing through the low voltage battery B2. Therefore, if the vehicle is continuously at standstill for a long period, the battery level of the low voltage battery B2 may become lower than a predetermined start-ensuring battery level, making it impossible to actuate the vehicle. To address this problem, the charge control unit 701 performs the auxiliary charge control at auxiliary charge timings (see time t1 and time t3 illustrated in FIG. 3) set by the auxiliary charge timing setting unit 702 (to be described later) so as to charge the low voltage battery B2 with the electric power from the high voltage battery B1. In this way, the charge control unit 701 prevents the battery level of the low voltage battery B2 from becoming lower than the start-ensuring battery level during a standstill of the vehicle. A specific process of the auxiliary charge performed by the charge control unit 701 will be described later with reference to FIG. 6.

Referring back to FIG. 2, the auxiliary charge timing setting unit 702 executes first auxiliary charge timing setting and second auxiliary charge timing setting (to be described later with reference to FIGS. 4 and 5) so as to set an auxiliary charge timing, which is time (more specifically, time and date) to execute the auxiliary charge control during a standstill period of the vehicle, the standstill period starting from acceptance of the OFF operation and ending at acceptance of the first ON operation by the BCM 72. The auxiliary charge timing setting unit 702 executes the first auxiliary charge timing setting (to be described later) in response to acceptance of the OFF operation by the BCM 72 (see time t0 in FIG. 3). The auxiliary charge timing setting unit 702 executes the second auxiliary charge timing setting (to be described later) in response to end of the auxiliary charge control performed by the charge control unit 701 (see time t3 in FIG. 3).

When the auxiliary charge timing set by the auxiliary charge timing setting unit 702 is reached during a standstill of the vehicle, the RTC 704 actuates the charge control unit 701, the auxiliary charge timing setting unit 702, and the management ECU 71.

Figure 4:
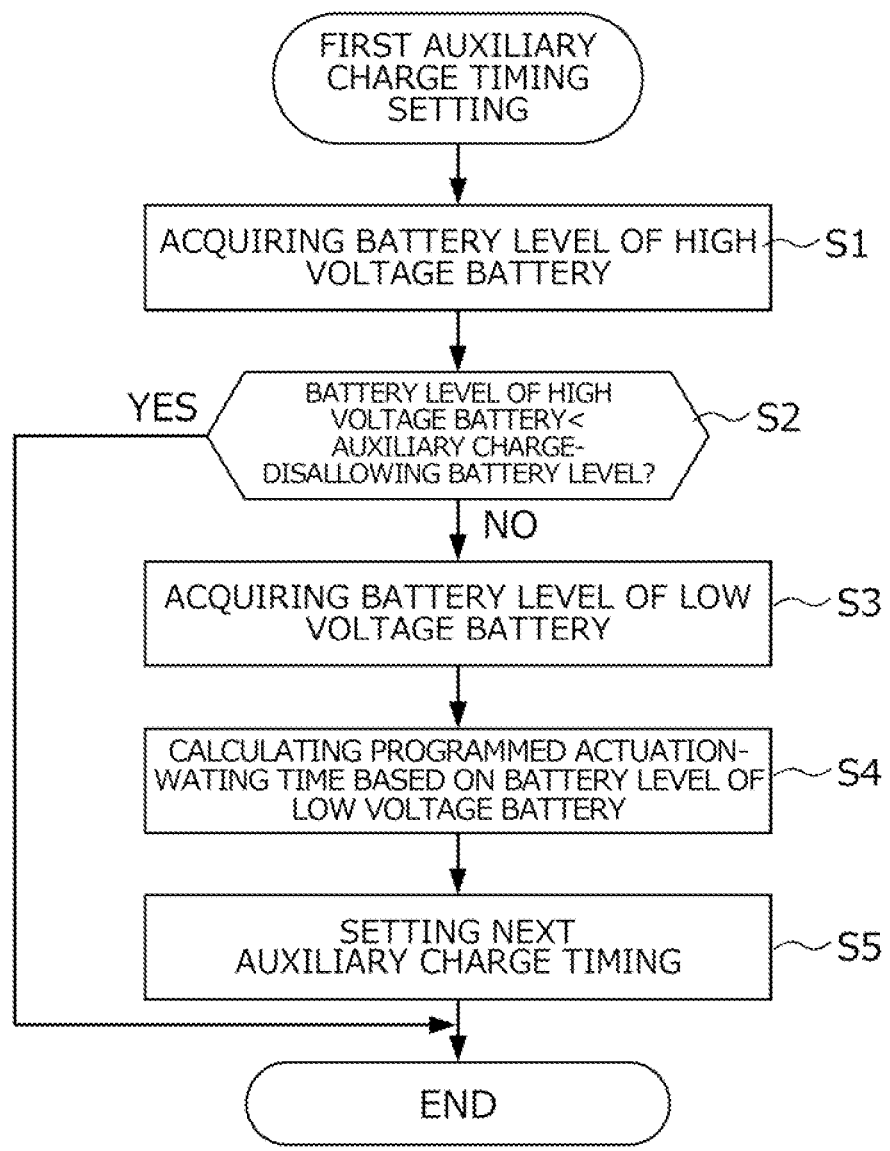
FIG. 4 is a flowchart illustrating a specific process of a first auxiliary charge timing setting.

FIG. 4 is a flowchart illustrating a specific process of the first auxiliary charge timing setting. The setting process illustrated in FIG. 4 is performed by the auxiliary charge timing setting unit 702 in response to acceptance of the OFF operation by the BCM 72.

First, in Step S1, the auxiliary charge timing setting unit 702 acquires a current battery level of the high voltage battery B1 from the management ECU 71. Next, in Step S2, the auxiliary charge timing setting unit 702 determines whether the acquired battery level of the high voltage battery B1 is lower than a predetermined auxiliary charge-disallowing battery level. If the determination result is NO in Step S2, the auxiliary charge timing setting unit 702 proceeds to Step s3.

In Step S3, the auxiliary charge timing setting unit 702 acquires a current battery level of the low voltage battery B2 from the management ECU 71.

In Step S4, the auxiliary charge timing setting unit 702 conducts, based on the acquired battery level, a search in a preset auxiliary charge timing determination map so as to calculate a programmed actuation-waiting time that is a period from the current time to a next auxiliary charge timing (see FIG. 3). According to the auxiliary charge timing determination map, the programmed actuation-waiting time is set longer with an increase in the battery level. In other words, the higher the battery level is, the later the next auxiliary charge timing is set. According to the auxiliary charge timing determination map, the programmed actuation-waiting time is set while a decrease in the battery level of the low voltage battery B2 that is caused due to the dark current during a standstill of the vehicle is taken into account, so that the battery level of the low voltage battery B2 is prevented from becoming lower than the start-ensuring battery level in the period from the current time to the next auxiliary charge timing. More specifically, according to the auxiliary charge timing determination map, the programmed actuation-waiting time is set such that at the lapse of the programmed actuation-waiting time from the current time, the battery level of the low voltage battery B2 becomes equal to the sum of the start-ensuring battery level and a plus error margin.

In Step S5, the auxiliary charge timing setting unit 702 sets a next auxiliary charge timing based on the calculated programmed actuation-waiting time, and ends the process illustrated in FIG. 4. More specifically, the auxiliary charge timing setting unit 702 calculates the next auxiliary charge timing (see time t1 in FIG. 3) by adding the programmed actuation-waiting time to the current time and date, and transmits the next auxiliary charge timing to the RTC 704. Subsequent to this, when the set auxiliary charge timing is reached, the RTC 704 actuates the charge control unit 701 to cause the same to perform the auxiliary charge control.

If the determination result is YES in Step S2, i.e., if the battery level of the high voltage battery B1 is lower than the auxiliary charge-disallowing battery level, the auxiliary charge timing setting unit 702 ends the process illustrated in FIG. 4 without setting a next auxiliary charge timing. Accordingly, subsequent to this, the charge control unit 701 is not actuated by the RTC 704. Thus, if the battery level of the high voltage battery B1 is lower than the auxiliary charge-disallowing battery level, the charge control unit 701 does not perform the auxiliary charge control.

Figure 5:
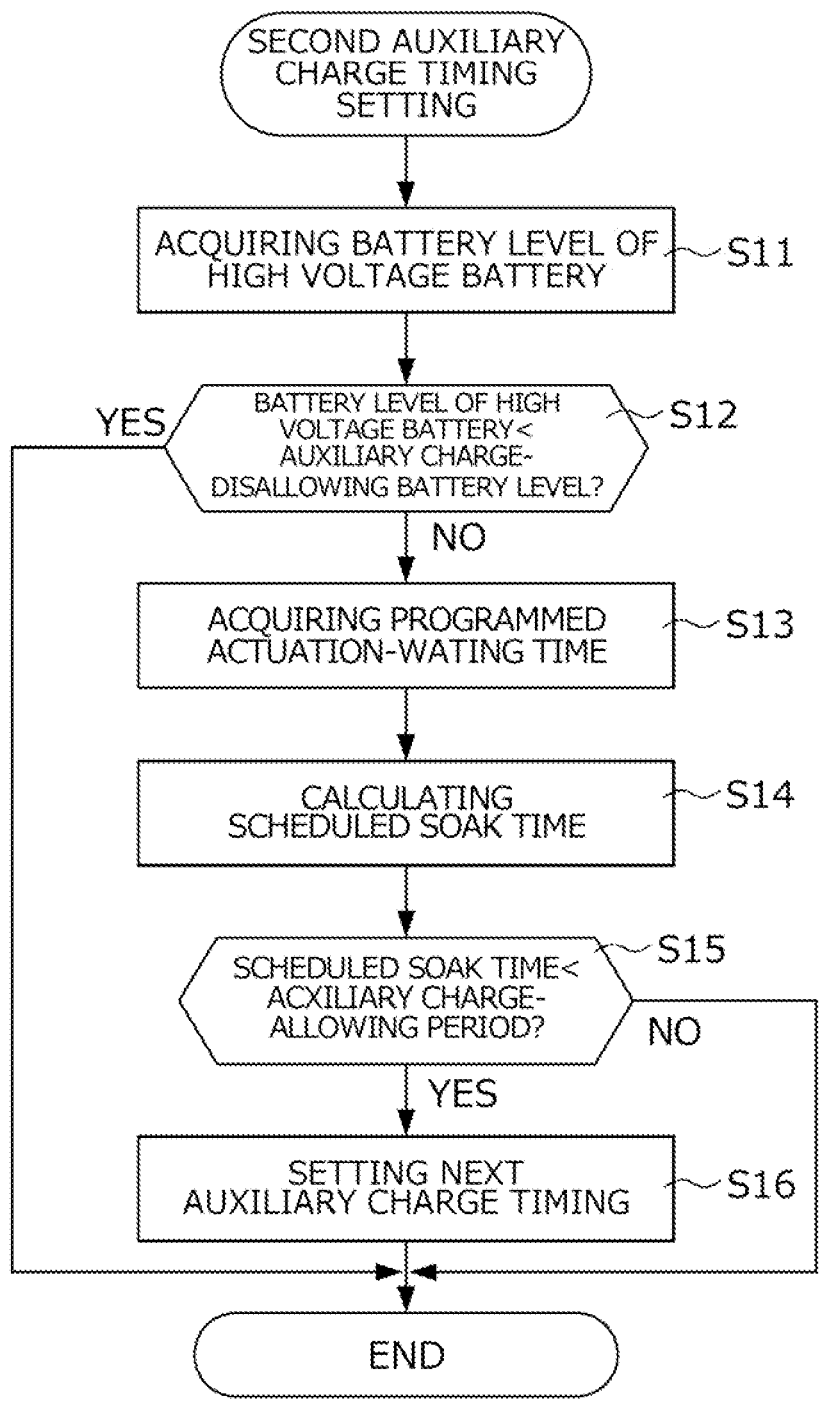
FIG. 5 is a flowchart illustrating a specific process of a second auxiliary charge timing setting.

FIG. 5 is a flowchart illustrating a specific process of the second auxiliary charge timing setting. The setting process illustrated in FIG. 5 is performed by the auxiliary charge timing setting unit 702 in response to end of the auxiliary charge control performed by the charge control unit 701 during a standstill of the vehicle.

First, in Step S11, the auxiliary charge timing setting unit 702 acquires a current battery level of the high voltage battery B1 from the management ECU 71. Next, in Step S12, the auxiliary charge timing setting unit 702 determines whether the acquired battery level of the high voltage battery B1 is lower than the auxiliary charge-disallowing battery level. If the determination result is NO in Step S12, the auxiliary charge timing setting unit 702 proceeds to Step S13.

In Step S13, the auxiliary charge timing setting unit 702 acquires a next programmed actuation-waiting time (see Steps S28, S31, and S32 in FIG. 6 to be described later) from the charge control unit 701. Next, in Step S14, the auxiliary charge timing setting unit 702 calculates a scheduled soak time by adding a time that has elapsed since the acceptance of the OFF operation by the BCM 72 and the programmed actuation-waiting time acquired in Step S13. Here, a soak time corresponds to a time that has elapsed since the acceptance of the OFF operation by the BCM 72. Thus, the scheduled soak time corresponds to a soak time from the current time to the expiration of the programmed actuation-waiting time.

Next, in Step S15, the auxiliary charge timing setting unit 702 determines whether the scheduled soak time calculated in Step S14 is shorter than a preset auxiliary charge-allowing period (e.g., several tens of days). If the determination result is YES in Step S15, the auxiliary charge timing setting unit 702 proceeds to Step S16.

In Step S16, the auxiliary charge timing setting unit 702 sets a next auxiliary charge timing based on the programmed actuation-waiting time acquired in Step S13, and ends the process illustrated in FIG. 5. More specifically, the auxiliary charge timing setting unit 702 calculates the next auxiliary charge timing (see time t3 in FIG. 3) by adding the programmed actuation-waiting time to the current time and date, and transmits the next auxiliary charge timing to the RTC 704. Subsequent to this, when the set auxiliary charge timing is reached, the RTC 704 actuates the charge control unit 701 to cause the same to perform the auxiliary charge control. That is, when the soak time is shorter than the auxiliary charge-allowing period, the charge control unit 701 performs the auxiliary charge control at the auxiliary charge timing set by the auxiliary charge timing setting unit 702.

On the other hand, if the determination result is NO in Step S15, the auxiliary charge timing setting unit 702 ends the process illustrated in FIG. 5 without setting a next auxiliary charge timing. Accordingly, subsequent to this, the charge control unit 701 is not actuated by the RTC 704. Thus, if the soak time is longer than the auxiliary charge-allowing period, the charge control unit 701 does not perform the auxiliary charge control. As a result, the auxiliary charge control is allowed to be performed during a period from the acceptance of the OFF operation by the BCM 72 to the expiration of the auxiliary charge-allowing period. Upon the expiration of the auxiliary charge-allowing period from the acceptance of the OFF operation by the BCM 72, an auxiliary charge-disallowing period (see FIG. 3) starts in which the auxiliary charge control is disallowed. If the determination result is YES in Step S12, i.e., if the battery level of the high voltage battery B1 is lower than the auxiliary charge-disallowing battery level, the auxiliary charge timing setting unit 702 also ends the process illustrated in FIG. 5 without setting a next auxiliary charge timing.

Figure 6:
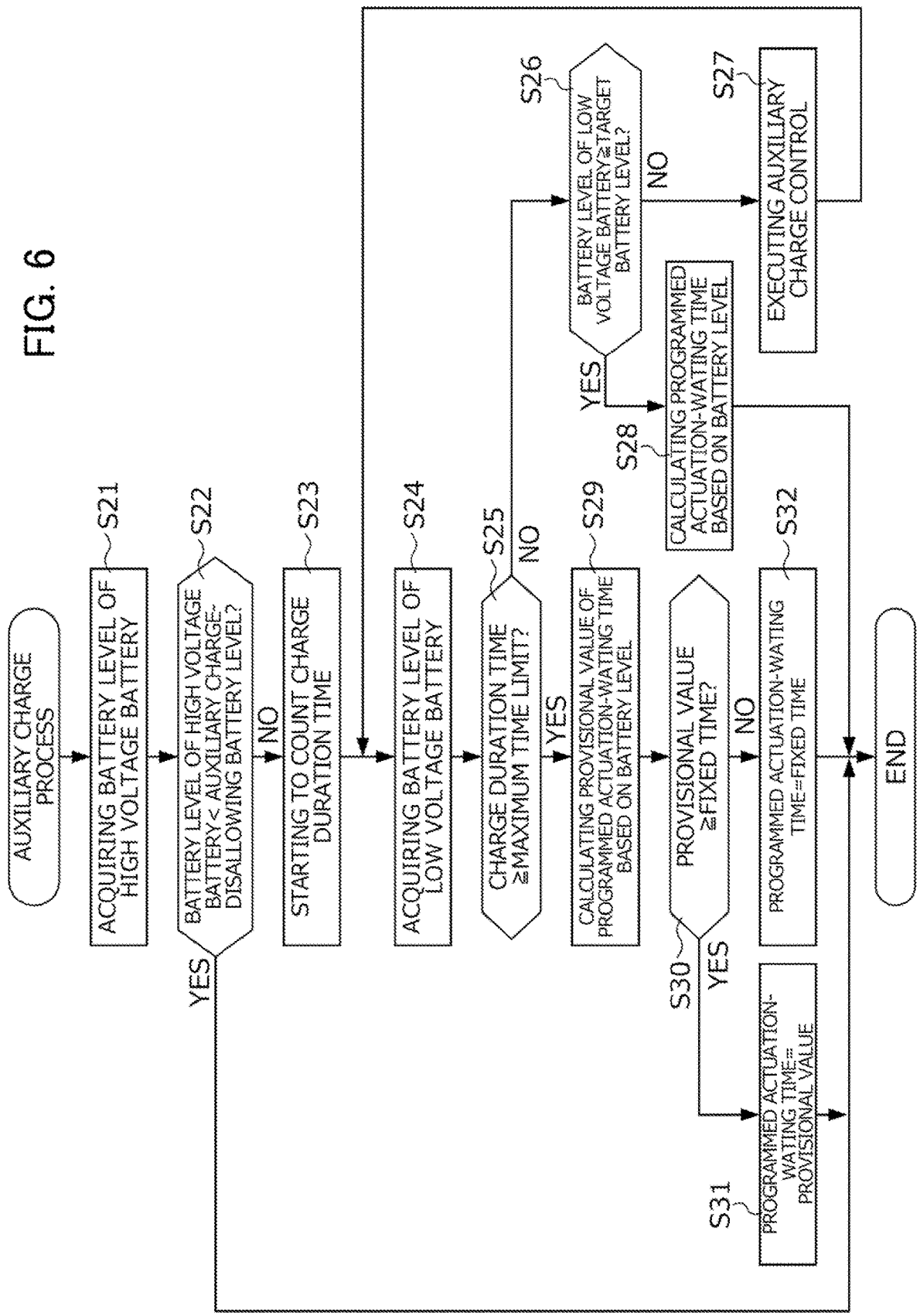
FIG. 6 is a flowchart illustrating a specific process of auxiliary charge.

FIG. 6 is a flowchart illustrating a specific process of the auxiliary charge. The process illustrated in FIG. 6 is performed by the charge control unit 701 in response to actuation by the RTC 704 during a standstill of the vehicle.

First, in Step S21, the charge control unit 701 acquires a current battery level of the high voltage battery B1 from the management ECU 71. Next, in Step S22, the charge control unit 701 determines whether the acquired battery level of the high voltage battery B1 is lower than the auxiliary charge-disallowing battery level. If the determination result is YES in Step 322, the charge control unit 701 promptly ends the process illustrated in FIG. 6. That is, if the battery level of the high voltage battery B1 is lower than the auxiliary charge-disallowing battery level, the charge control unit 701 ends the process illustrated in FIG. 6 without executing the auxiliary charge control (see Step S27). If the determination result is NO in Step S22, i.e., if the battery level of the high voltage battery B1 is equal to or higher than the auxiliary charge-disallowing battery level, the charge control unit 701 proceeds to Step S23.

In Step S23, the charge control unit 701 begins to make a count of a charge duration time that corresponds to a time that has elapsed since the start of the auxiliary charge control. Next, in Step S24, the charge control unit 701 acquires a current battery level of the low voltage battery B2 from the management ECU 71.

Next, in Step S25, the charge control unit 701 determines whether the charge duration time is equal to or longer than a preset maximum time limit (e.g., several hours). If the determination result is NO in Step S25, the charge control unit 701 proceeds to Step S26.

In Step S26, the charge control unit 701 determines whether or not the battery level of the low voltage battery B2 acquired in Step S24 is equal to or higher than the target battery level. If the determination result is NO in Step S26, the charge control unit 701 proceeds to Step S27. In Step S27, the charge control unit 701 executes the auxiliary charge control, and then, returns to Step S24. More specifically, the charge control unit 701 operates the voltage converter 4 so that the electric power supplied from the high voltage battery B1 to the high voltage circuit 2 is reduced in voltage, and then, is supplied to the low voltage circuit 3, thereby charging the low voltage battery B2.

If the determination result is YES in Step S26, i.e., if the battery level of the low voltage battery B2 exceeds the target battery level, the charge control unit 701 proceeds to Step S28. In Step 328, the charge control unit 701 conducts a search in the auxiliary charge timing determination map described above, based on the battery level of the low voltage battery B2, so as to calculate a next programmed actuation-waiting time. Thereafter, the charge control unit 701 ends the process illustrated in FIG. 6.

If the determination result is YES in Step S25, i.e., if the charge duration time exceeds the maximum time limit before the battery level of the low voltage battery B2 becomes higher than the target battery level, the charge control unit 701 proceeds to Step S29. In Step S29, the charge control unit 701 conducts a search in the auxiliary charge timing determination map described above, based on the battery level of the low voltage battery B2, so as to calculate a provisional value of a next programmed actuation-waiting time.

In Step S30, the charge control unit 701 determines whether or not the provisional value of the programmed actuation-waiting time calculated in Step S29 is equal to or greater than a predetermined fixed time. If the determination result is YES in Step S30, the charge control unit 701 proceeds to Step S31. If the determination result is NO in Step S30, the charge control unit 701 proceeds to Step S32. In Step S31, the charge control unit 701 defines the provisional value, which has been calculated based on the battery level of the low voltage battery B2, as the programmed actuation-waiting time, and then, ends the process illustrated in FIG. 6. In Step S32, the charge control unit 701 defines the predetermined fixed time as the programmed actuation-waiting time, and then, ends the process illustrated in FIG. 6.

As can be seen, in Steps S30 to S32, if the auxiliary charge control ends due to the charge duration time exceeding the maximum time limit, the charge control unit 701 defines, as the programmed actuation-waiting time, the provisional time calculated based on the battery level of the low voltage battery B2 or the predetermined fixed time, whichever is longer. As described above, in Step S16 of the second auxiliary charge timing setting illustrated in FIG. 5, a next auxiliary charge timing is set by adding, to the current time and date, the programmed actuation-waiting time calculated in the process of the auxiliary charge illustrated in FIG. 6. Accordingly, if the auxiliary charge control has ended due to the charge duration time exceeding the maximum time limit, the auxiliary charge timing setting unit 702 sets, as the auxiliary charge timing, time calculated based on the battery level of the low voltage battery B2 at that point of time or predetermined time, whichever is later.

Next, interrupt processes that are performed when the user operates the vehicle or the mobile terminal during execution of the auxiliary charge illustrated in FIG. 6 in a standstill period of the vehicle will be described with reference to time charts of FIGS. 7 to 11 and a flowchart of FIG. 12.

Figure 7:
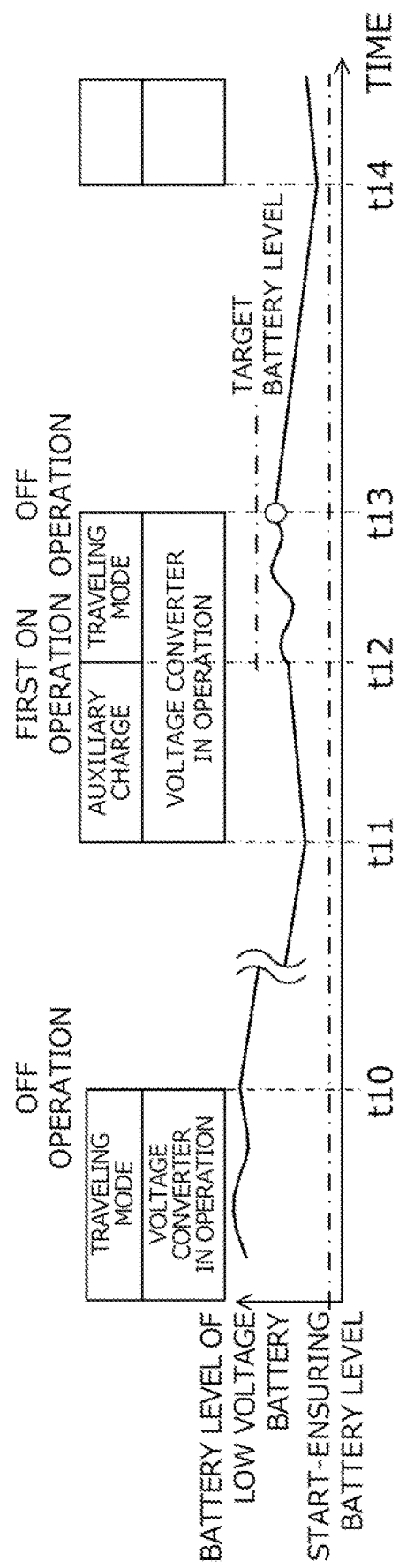
FIG. 7 is a time chart illustrating an interrupt process that is executed when a user performs a first ON operation during execution of the auxiliary charge.

FIG. 7 is a time chart illustrating an interrupt process that is executed when the user performs the first ON operation during execution of the auxiliary charge. FIG. 7 illustrates a case where the BCM 72 accepts the OFF operation performed by the user at time t10, and thereafter, the charge control unit 701 is actuated by the RTC 704 and starts the auxiliary charge control illustrated in FIG. 6 at time t11.

First, once the auxiliary charge control is started at time t11, the battery level of the low voltage battery B2 gradually increases due to electric power supplied from the high voltage battery B1. As illustrated in FIG. 7, when the BCM 72 accepts the first ON operation performed by the user (see time t12) during execution of the auxiliary charge control, the charge control unit 701 switches from the auxiliary charge control to the normal charge control while keeping the voltage converter 4 in operation. As described earlier, in the normal charge control, the electric power outputted from the high voltage battery B1 or the regenerative power is appropriately supplied such that the battery level of the low voltage battery B2 is maintained at the target battery level. Therefore, subsequent to time t12, the battery level of the low voltage battery B2 gradually increases toward the target battery level while fluctuating.

Thereafter, in response to acceptance of the user's OFF operation by the BCM 72 at time t13, the auxiliary charge timing setting unit 702 executes the first auxiliary charge timing setting illustrated in FIG. 4. Consequently, a next auxiliary charge timing is set to time t14 based on the battery level of the low voltage battery B2 at time t13 when the OFF operation was accepted.

Figure 8:
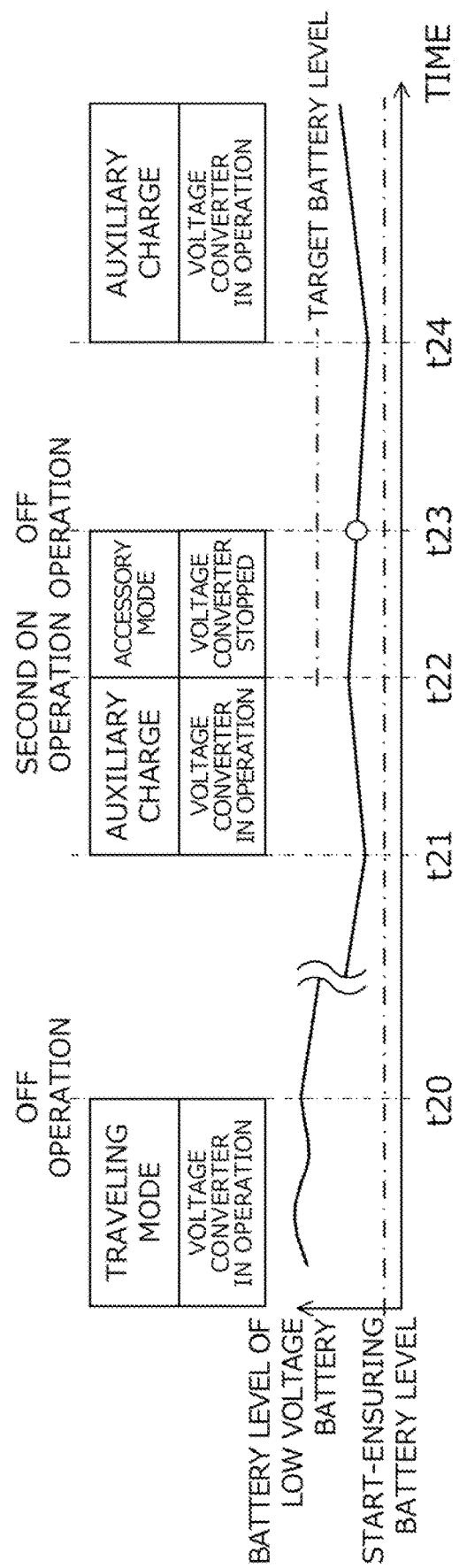
FIG. 8 is a time chart illustrating an interrupt process that is executed when the user performs a second ON operation during execution of the auxiliary charge.

FIG. 8 is a time chart illustrating an interrupt process that is executed when the user performs the second ON operation during execution of the auxiliary charge. FIG. 8 illustrates a case where the BCM 72 accepts the OFF operation performed by the user at time t20, and thereafter, the charge control unit 701 is actuated by the RTC 704 and starts the auxiliary charge control illustrated in FIG. 6 at time t21.

First, once the auxiliary charge control is started at time t21, the battery level of the low voltage battery B2 gradually increases due to electric power supplied from the high voltage battery B1. As illustrated in FIG. 8, when the BCM 72 accepts the second ON operation performed by the user (see time t22) during execution of the auxiliary charge control, the charge control unit 701 stops the voltage converter 4 and ends the ongoing auxiliary charge control. In response to acceptance of the second ON operation by the BCM 72, the vehicle is actuated in the accessory mode, thereby allowing the user to use the vehicle auxiliary equipment. 31 supplied with the electric power from the low voltage battery B2. Consequently, subsequent to time t22, the battery level of the low voltage battery B2 gradually decreases.

Thereafter, in response to acceptance of the user's OFF operation by the BCM 72 at time t23, the auxiliary charge timing setting unit 702 executes the first auxiliary charge timing setting illustrated in FIG. 4. Consequently, a next auxiliary charge timing is set to time t24 based on the battery level of the low voltage battery B2 at time t23 when the OFF operation was accepted.

Figure 9:
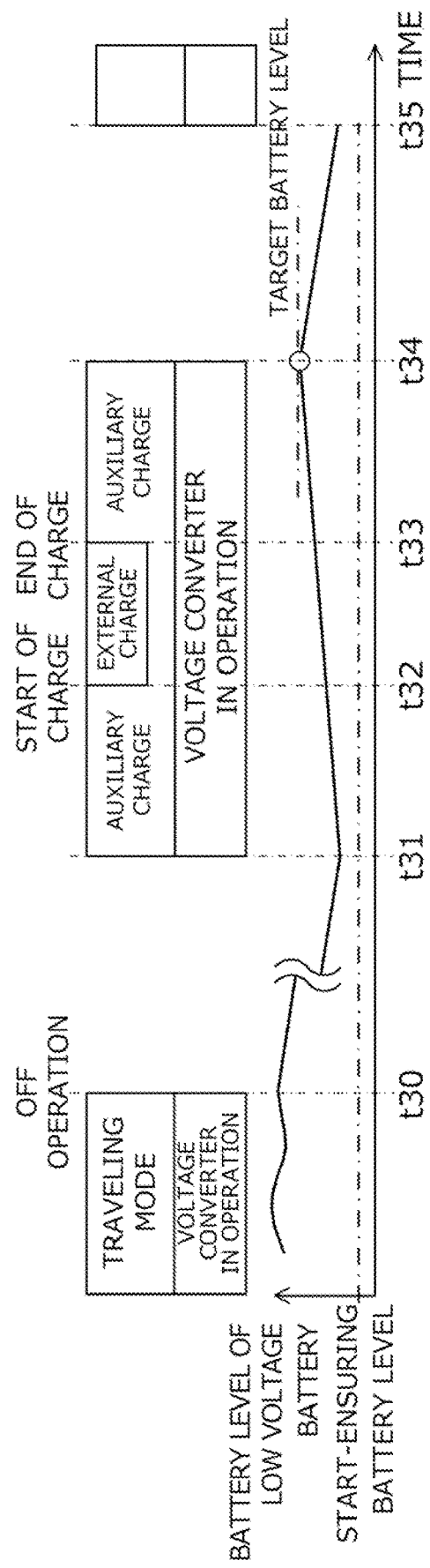
FIG. 9 is a time chart illustrating an interrupt process that is executed when external charge is performed during execution of the auxiliary charge.

FIG. 9 is a time chart illustrating an interrupt process that is executed when the external charge is performed during execution of the auxiliary charge. FIG. 9 illustrates a case where the BCM 72 accepts the OFF operation performed by the user at time t30, and thereafter, the charge control unit 701 is actuated by the RTC 704 and starts the auxiliary charge control illustrated in FIG. 6 at time t31.

First, once the auxiliary charge control is started at time t31, the battery level of the low voltage battery B2 gradually increases due to electric power supplied from the high voltage battery B1. As illustrated in FIG. 9, when the external charge is started during execution of the auxiliary charge control (see time t32), the charge control unit 701 continues executing the auxiliary charge control while keeping the voltage converter 4 in operation. More specifically, the charge control unit 701 continues executing the auxiliary charge control until the battery level of the low voltage battery B2 reaches the target battery level (see Step S26 of FIG. 6). Consequently, subsequent to time t32, the high voltage battery B1 is charged with electric power suppled to the high voltage circuit 2 from the onboard charger 22, while the low voltage battery B2 is also charged. Even if charging of the high voltage battery B1 is completed at time t33, the charge control unit 701 continues executing the auxiliary charge control provided that the battery level of the low voltage battery B2 has not yet reached the target battery level at that point of time.

When the battery level of the low voltage battery B2 reaches the target battery level at time t34, the charge control unit 701 calculates a programmed actuation-waiting time based on the battery level of the low voltage battery B2 at that point of time (see Step S28 in FIG. 6). The auxiliary charge timing setting unit 702 sets a next auxiliary charge timing to time t35 based on the programmed actuation-waiting time.

Figure 10:
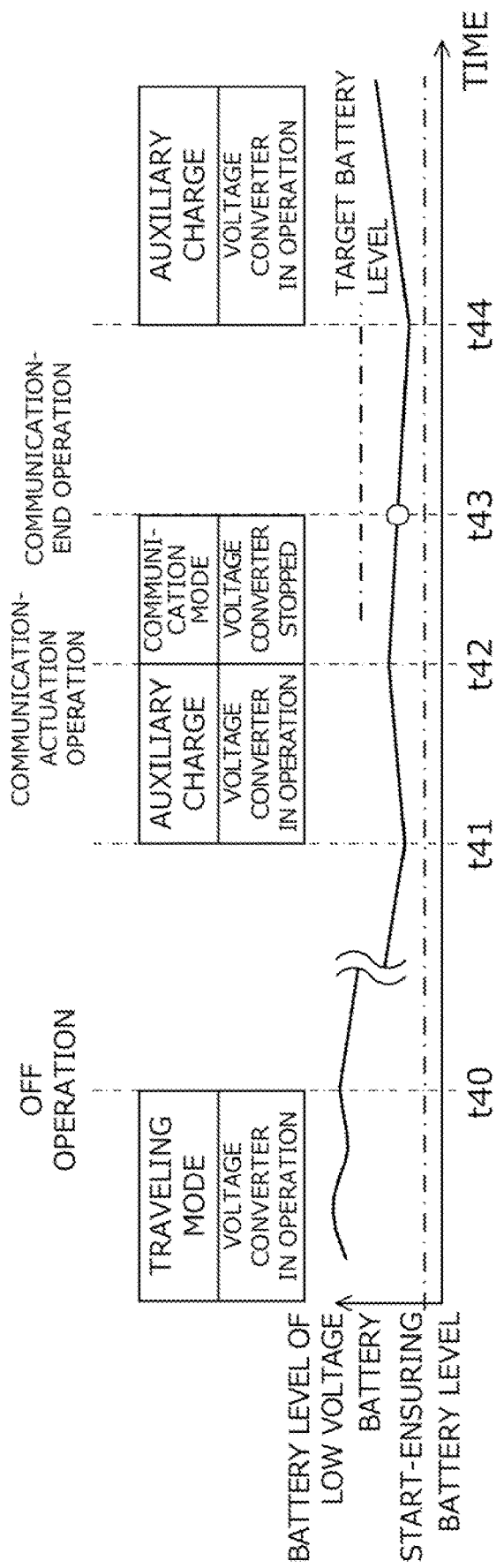
FIG. 10 is a time chart illustrating an interrupt process that is executed when a communication-actuation operation is performed by the user during execution of the auxiliary charge.

FIG. 10 is a time chart illustrating an interrupt process that is executed when the communication-actuation operation is performed by the user during execution of the auxiliary charge. FIG. 10 illustrates a case where the BCM 72 accepts the OFF operation performed by the user at time t40, and thereafter, the charge control unit 701 is actuated by the RTC 704 and starts the auxiliary charge control illustrated in FIG. 6 at time t41.

First, once the auxiliary charge control is started at time t41, the battery level of the low voltage battery B2 gradually increases due to electric power supplied from the high voltage battery B1. As illustrated in FIG. 10, when the telematic ECU 73 accepts the communication-actuation operation performed by the user during execution of the auxiliary charge control (see time t42), the charge control unit 701 stops the voltage converter 4 and ends the ongoing auxiliary charge control. As stated earlier, the telematic ECU 73 actuates the vehicle in the communication mode upon acceptance of the communication-actuation operation performed by the user. Therefore, subsequent to time t42, the battery level of the low voltage battery B2 gradually decreases.

Thereafter, in response to acceptance of the user's communication-end operation by the telematic ECU 73 at time t43, the auxiliary charge timing setting unit 702 executes the first auxiliary charge timing setting illustrated in FIG. 4. Consequently, a next auxiliary charge timing is set to time t44 based on the battery level of the low voltage battery B2 at time t43 when the communication-end operation was accepted.

Figure 11:
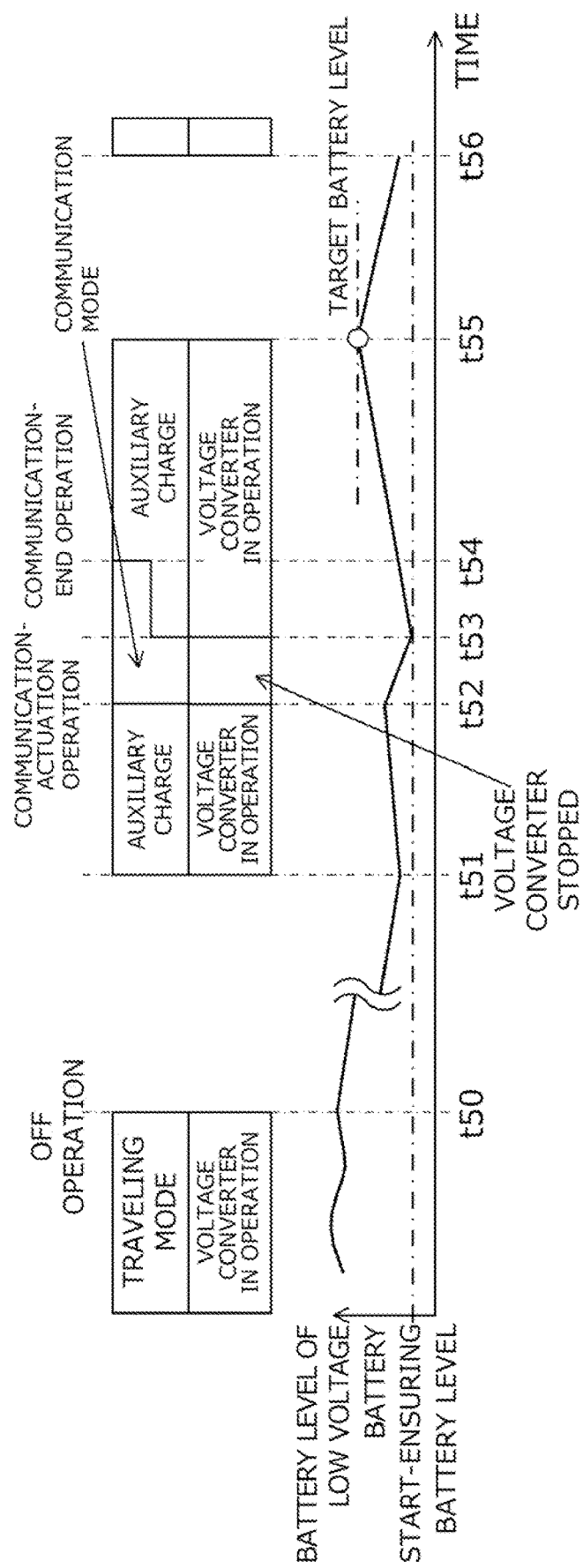
FIG. 11 is a time chart illustrating an interrupt process that is executed when a communication-actuation operation is performed by the user during execution of the auxiliary charge.

FIG. 11 is a time chart illustrating an interrupt process that is executed when the communication-actuation operation is performed by the user during execution of the auxiliary charge. Note the process subsequent to time t52 of the time chart of FIG. 11 differs from the corresponding process of the time chart of FIG. 10.

As illustrated in FIG. 11, when the telematic ECU 73 accepts the communication-actuation operation performed by the user during execution of the auziliary charge control (see time t52), the charge control unit 701 stops the voltage converter 4 and ends the ongoing auxiliary charge control. Therefore, the battery level of the low voltage battery B2 gradually decreases so as to reach the start-ensuring battery level at time t53. After ending the auxiliary charge control in response to acceptance of the communication-actuation operation, the charge control unit 701 resumes the auxiliary charge control when the battery level of the low voltage battery B2 becomes lower than the start-ensuring battery level (see time t53), as illustrated in FIG. 11. More specifically, the charge control unit 701 continues executing the auxiliary charge control until the battery level of the low voltage battery B2 reaches the target battery level. Thus, the charge control unit 701 executes the auxiliary charge control without interruption, irrespective of the acceptance of the user's communication-end operation by the telematic ECU 73 at time t54.

If the battery level of the low voltage battery B2 reaches the target battery level at time t55, the charge control unit 701 calculates a programmed actuation-waiting time based on the battery level of the low voltage battery B2 at that point of time (see Step S28 in FIG. 6). The auxiliary charge timing setting unit 702 sets a next auxiliary charge timing to time t56 based on the programmed actuation-waiting time.

FIG. 12 is a flowchart illustrating an interrupt process that is executed when the first ON operation or the communication-actuation operation is performed by the user during execution of the auxiliary charge. The process illustrated in FIG. 12 is performed repeatedly by the charge control unit 701 during execution of the auxiliary charge illustrated in FIG. 6.

First, in Step 341, the charge control unit 701 determines whether the BCM 72 has accepted the first ON operation performed by the user. If the determination result is YES in Step S41, the charge control unit 701 proceeds to Step S42. If the determination result is NO, the charge control unit 701 proceeds to Step S43. In Step S42, the charge control unit 701 switches from the auxiliary charge control to the normal charge control while keeping the voltage converter 4 in operation, and thereafter, ends the process illustrated in FIG. 12.

In Step S43, the charge control unit 701 determines whether the telematic ECU 73 has accepted the communication-actuation operation performed by the user. If the determination result is NO in Step S43, the charge control unit 701 proceeds to Step S44. If the determination result is YES, the charge control unit 701 proceeds to Step S45. In Step 344, the charge control unit 701 continues the ongoing auxiliary charge control, and then, ends the process illustrated in FIG. 12.

In Step S45, the charge control unit 701 stops the voltage converter 4, and then, ends the ongoing auxiliary charge control. In Step S46, the charge control unit 701 determines whether the telematic ECU 73 has accepted the communication-end operation performed by the user. If the determination result is NO in Step S46, the charge control unit 701 returns to Step S46. If the determination result is YES, the charge control unit 701 proceeds to Step S47.

In Step S47, the charge control unit 701 determines whether the battery level of the low voltage battery B2 is lower than the start-ensuring battery level. If the determination result is YES in Step S47, the charge control unit 701 proceeds to Step S48 to resume the auxiliary charge control, and then, ends the process illustrated in FIG. 12. In Step S48, the charge control unit 701 also transmits a command signal to the auxiliary charge timing setting unit 702 to cause the auxiliary charge timing setting unit 702 to execute the first auxiliary charge timing setting illustrated in FIG. 4 in order that a next auxiliary charge timing is set based on the current battery level of the low voltage battery B2. Thereafter, the charge control unit 701 ends the process illustrated in FIG. 12.

The power system 1 of the present embodiment exerts the following effects.

(1) The auxiliary charge timing setting unit 702 sets the auxiliary charge timing, at which the auxiliary charge control is to be executed during a standstill period of the vehicle, the standstill period starting from acceptance of the OFF operation performed by the user and ending at acceptance of the first ON operation performed by the user. If the soak time, which is a time that has elapsed since the acceptance of the OFF operation is shorter than the predetermined auxiliary charge-allowing period, the charge control unit 701 executes the auxiliary charge control at the timing set by the auxiliary charge timing setting unit 702. This feature makes it possible to prevent the battery level of the low voltage battery B2 from decreasing excessively during a standstill of the vehicle V. On the other hand, if the soak time is longer than the auxiliary charge-allowing period, the charge control unit 701 does not execute auxiliary charge control. With this feature, the auxiliary charge control is not allowed to be executed repeatedly in a case where the vehicle V is continuously at a standstill for a long period exceeding the auxiliary charge-allowing period, thereby preventing the battery level of the high voltage battery B1 from decreasing significantly.

(2) For example, charging of the low voltage battery B2 proceeds with a lower charge efficiency in a low-temperature environment than in a normal-temperature environment. Therefore, continuing the auxiliary charge control in such a low-temperature environment until the battery level of the low voltage battery B2 reaches the target battery level may lead to a long charge time. In this case, the auxiliary charge control may consume an increased amount of electric power from the high voltage battery B1. To address this, the charge control unit 701 ends the auxiliary charge control if the battery level of the low voltage battery B2 exceeds the target battery level after start of the auxiliary charge control or if the charge duration time, which is a time that has elapsed since the start of the auxiliary charge control, exceeds the maximum time limit. This feature can prevent the battery level of the high voltage battery B1 in a low-temperature environment from decreasing unintentionally and significantly due to the auxiliary charge control.

(3) The auxiliary charge timing setting unit 702 sets a next auxiliary charge timing after end of the auxiliary charge control. If the auxiliary charge control has ended due to the charge duration time exceeding the maximum time limit, the auxiliary charge timing setting unit 702 sets, as the auxiliary charge timing, the time calculated based on the battery level of the low voltage battery B2 or the predetermined time, whichever is later. With this feature, the auxiliary charge control is not allowed to be executed highly frequently in such a low-temperature environment that the charge duration time is prolonged to exceed the maximum time limit, thereby preventing the battery level of the high voltage battery B1 from decreasing significantly.

(4) When the first ON operation for actuating the vehicle V in the traveling mode is accepted during execution of the auxiliary charge control, the charge control unit 701 switches from the ongoing auxiliary charge control to the normal charge control. This feature makes it possible to continue charging the low voltage battery B2 while allowing the user to perform the interrupt operation.

(5) When the second ON operation for actuating the vehicle V in the accessory mode is accepted during execution of the auxiliary charge control, the charge control unit 701 ends the auxiliary charge control. This feature makes it possible to avoid a situation in which the user is prevented from using the vehicle auxiliary equipment 31 because of excessively high priority assigned to the ongoing auxiliary charge control.

(6) When the communication-actuation operation performed via the mobile terminal 85 by the user is accepted during execution of the auxiliary charge control, the charge control unit 701 ends the auxiliary charge control. This feature makes it possible to avoid a situation in which the user's operation via the mobile terminal 85 is hindered because of excessively high priority assigned to the ongoing auxiliary charge control.

(7) The auxiliary charge timing setting unit 702 sets the auxiliary charge timing at which the charge control unit 701 executes the auxiliary charge control during a standstill period of the vehicle from acceptance of the user's OFF operation to acceptance of the user's first ON operation, while the management ECU 71 acquires the battery level of the high voltage battery B1. Further, if the battery level of the high voltage battery B1 is higher than the auxiliary charge-disallowing battery level, the charge control unit 701 executes the auxiliary charge control at the auxiliary charge timing set by the auxiliary charge timing setting unit 702. This feature makes it possible to prevent the battery level of the low voltage battery B2 from decreasing excessively during a standstill of the vehicle V. If the battery level of the high voltage battery B1 is lower than the auxiliary charge-disallowing battery level, the charge control unit 701 does not execute the auxiliary charge control. With this feature, the auxiliary charge control is not allowed to be executed repeatedly during a standstill of the vehicle V, thereby making it possible to prevent the battery level of the high voltage battery B1 from decreasing to become lower than the auxiliary charge-disallowing battery level.

In the foregoing, one embodiment of the present disclosure has been described. However, it should be noted that the above embodiment is not intended to limit the present disclosure. Appropriate modifications may be made to the specifics of the present disclosure, without deviating from the spirit of the present disclosure.

What is claimed is:

1. A power system for a vehicle, the power system comprising:
   a low voltage circuit provided with a low voltage power storage device;
   a high voltage circuit provided with a high voltage power storage device having a higher voltage than the low voltage power storage device;
   a charge circuit connecting the low voltage circuit to the high voltage circuit;
   a charge control unit configured to execute an auxiliary charge control to charge the low voltage power storage device with electric power from the high voltage circuit by operating the charge circuit;
   an operation acceptance unit configured to accept an ON operation for actuating the vehicle or an OFF operation for bringing the vehicle to a standstill, the ON and OFF operations being performed by a user; and
   a timing setting unit configured to set a charge timing at which the auxiliary charge control is to be executed during a standstill period of the vehicle, the standstill period starting from acceptance of the OFF operation and ending at acceptance of the ON operation,
   wherein the timing setting unit sets a first charge timing in response to acceptance of the OFF operation, and then sets a second and subsequent charge timings each time after the auxiliary charge control is executed during the standstill period,
wherein if a soak time as a time that has elapsed since the acceptance of the OFF operation is before a predetermined auxiliary charge-allowing period elapses, the charge control unit executes the auxiliary charge control at the charge timing set by the timing setting unit, and
wherein if the soak time reaches an auxiliary charge-disallowing period after the auxiliary charge-allowing period, the charge control unit does not execute the auxiliary charge control until the acceptance of the ON operation.

2. The power system according to claim 1, wherein the charge control unit ends the auxiliary charge control when an amount of power remaining in the low voltage power storage device exceeds a first remaining amount of power after start of the auxiliary charge control, or when a charge duration time as a time that has elapsed since the start of the auxiliary charge control exceeds a predetermined second time period.

3. The power system according to claim 2,
wherein if the auxiliary charge control has ended due to the charge duration time exceeding the second time period, the timing setting unit sets, as the charge timing, time calculated based on the amount of power remaining in the low voltage power storage device or predetermined time, whichever is later.

4. The power system according to claim 3, wherein the operation acceptance unit is configured to accept a first ON operation performed by the user for actuating the vehicle in a traveling mode,
wherein the charge control unit is capable of selectively executing a normal charge control and the auxiliary charge control, the normal charge control being executed to charge the low voltage power storage device with the electric power from the high voltage circuit by operating the charge circuit when the vehicle is traveling, and
wherein the charge control unit switches from the auxiliary charge control to the normal charge control when the first ON operation is accepted during execution of the auxiliary charge control.

5. The power system according to claim 4, wherein the operation acceptance unit is configured to accept a second ON operation performed by the user for actuating the vehicle in an accessory mode in which use of auxiliary equipment of the vehicle is allowed, and
wherein the charge control unit ends the auxiliary charge control when the second ON operation is accepted during execution of the auxiliary charge control.

6. The power system according to claim 5, further comprising:
a communication unit capable of communicating with a mobile terminal present outside the vehicle, and configured to accept a communication-actuation operation performed by the user for actuating the vehicle in a communication mode,
wherein the charge control unit ends the auxiliary charge control when the communication-actuation operation is accepted during execution of the auxiliary charge control, and thereafter, resumes the auxiliary charge control when the amount of power remaining in the low voltage power storage device becomes less than a predetermined second remaining amount of power.

7. The power system according to claim 1, wherein the operation acceptance unit is configured to accept a first ON operation performed by the user for actuating the vehicle in a traveling mode,
wherein the charge control unit is capable of selectively executing a normal charge control and the auxiliary charge control, the normal charge control being executed to charge the low voltage power storage device with the electric power from the high voltage circuit by operating the charge circuit when the vehicle is traveling, and
wherein the charge control unit switches from the auxiliary charge control to the normal charge control when the first ON operation is accepted during execution of the auxiliary charge control.

8. The power system according to claim 1, wherein the operation acceptance unit is configured to accept a second ON operation performed by the user for actuating the vehicle in an accessory mode in which use of auxiliary equipment of the vehicle is allowed, and
wherein the charge control unit ends the auxiliary charge control when the second ON operation is accepted during execution of the auxiliary charge control.

9. The power system according to claim 1, further comprising:
a communication unit capable of communicating with a mobile terminal present outside the vehicle, and configured to accept a communication-actuation operation performed by the user for actuating the vehicle in a communication mode,
wherein the charge control unit ends the auxiliary charge control when the communication-actuation operation is accepted during execution of the auxiliary charge control, and thereafter, resumes the auxiliary charge control when the amount of power remaining in the low voltage power storage device becomes less than a predetermined second remaining amount of power.

10. The power system according to claim 2, wherein the operation acceptance unit is configured to accept a first ON operation performed by the user for actuating the vehicle in a traveling mode,
wherein the charge control unit is capable of selectively executing a normal charge control and the auxiliary charge control, the normal charge control being executed to charge the low voltage power storage device with the electric power from the high voltage circuit by operating the charge circuit when the vehicle is traveling, and
wherein the charge control unit switches from the auxiliary charge control to the normal charge control when the first ON operation is accepted during execution of the auxiliary charge control.

11. The power system according to claim 2, wherein the operation acceptance unit is configured to accept a second ON operation performed by the user for actuating the vehicle in an accessory mode in which use of auxiliary equipment of the vehicle is allowed, and
wherein the charge control unit ends the auxiliary charge control when the second ON operation is accepted during execution of the auxiliary charge control.

12. The power system according to claim 2, further comprising:
a communication unit capable of communicating with a mobile terminal present outside the vehicle, and configured to accept a communication-actuation operation performed by the user for actuating the vehicle in a communication mode, wherein the charge control unit ends the auxiliary charge control when the communication-actuation operation is accepted during execution of the auxiliary charge control, and thereafter, resumes the auxiliary charge control when the amount of power remaining in the low voltage power storage device becomes less than a predetermined second remaining amount of power.

13. The power system according to claim 3, wherein the operation acceptance unit is configured to accept a second ON operation performed by the user for actuating the vehicle in an accessory mode in which use of auxiliary equipment of the vehicle is allowed, and wherein the charge control unit ends the auxiliary charge control when the second ON operation is accepted during execution of the auxiliary charge control.

14. The power system according to claim 3, further comprising:

a communication unit capable of communicating with a mobile terminal present outside the vehicle, and configured to accept a communication-actuation operation performed by the user for actuating the vehicle in a communication mode, wherein the charge control unit ends the auxiliary charge control when the communication-actuation operation is accepted during execution of the auxiliary charge control, and thereafter, resumes the auxiliary charge control when the amount of power remaining in the low voltage power storage device becomes less than a predetermined second remaining amount of power.

15. The power system according to claim 1, further comprising:

a remaining amount-acquisition unit configured to acquire an amount of power remaining in the high voltage power storage device, wherein if the amount of power remaining in the high voltage power storage device is greater than a predetermined third remaining amount of power during the standstill period, the charge control unit executes the auxiliary charge control at the charge timing set by the charge timing setting unit, and wherein if the amount of power remaining in the high voltage power storage device is less than the third remaining amount of power during the standstill period, the charge control unit does not execute the auxiliary charge control until the acceptance of the ON operation.

* * * * *